(12) United States Patent
Wang

(10) Patent No.: US 10,599,163 B2
(45) Date of Patent: Mar. 24, 2020

(54) MULTIPURPOSE FLOAT SWITCH MOUNTING BRACKET

(71) Applicant: GP Enterprises Co., Ltd, Suzhou, Jiangsu (CN)

(72) Inventor: Xian Wang, Jiangsu (CN)

(73) Assignee: GP Enterprises Co., Ltd., Suzhou (CN)

( * ) Notice: Subject to any disclaimer, the term of this patent is extended or adjusted under 35 U.S.C. 154(b) by 0 days.

(21) Appl. No.: 16/202,118

(22) Filed: Nov. 28, 2018

(65) Prior Publication Data

US 2019/0163208 A1     May 30, 2019

Related U.S. Application Data

(63) Continuation of application No. PCT/CN2017/116069, filed on Dec. 14, 2017.

(30) Foreign Application Priority Data

Nov. 29, 2017   (CN) .......................... 2017 2 1624468

(51) Int. Cl.
  *F16M 13/00*  (2006.01)
  *G05D 9/12*   (2006.01)
  *F16M 13/02*  (2006.01)

(52) U.S. Cl.
  CPC .............. *G05D 9/12* (2013.01); *F16M 13/02* (2013.01)

(58) Field of Classification Search
  CPC ........... F16M 13/02; F16L 3/233; F16L 3/137

USPC ..... 248/218.4, 219.1, 219.3, 219.4, 65, 74.3
See application file for complete search history.

(56) References Cited

U.S. PATENT DOCUMENTS

| | | | |
|---|---|---|---|
| 6,508,446 B1* | 1/2003 | Addison | A47D 13/105 182/187 |
| 6,565,048 B1* | 5/2003 | Meyer | F16L 3/02 248/58 |
| 7,191,998 B1* | 3/2007 | Chalberg | F04D 29/605 248/225.21 |
| 9,496,698 B2* | 11/2016 | Korcz | H02G 3/10 |
| 2010/0314514 A1* | 12/2010 | Nelson | F16M 11/08 248/219.1 |
| 2014/0318891 A1* | 10/2014 | Crothers | E04G 5/14 182/113 |

FOREIGN PATENT DOCUMENTS

CN            202901756 U     4/2013

* cited by examiner

*Primary Examiner* — Steven M Marsh

(57) ABSTRACT

This invention discloses a multipurpose float switch mounting bracket, which comprises a curved plate and a flat plate, the curved plate is connected to a first end of the flat plate, and two position-limitation strips are arranged on the outer convex surface of the curved plate, the flat plate is provided with a first set of mounting holes and a second set of mounting holes. The pump is provided with a first set of threaded holes which are corresponding to the first set of mounting holes, and the float switch is provided with a second set of threaded holes which are corresponding to the second set of mounting holes. Via the above solution, the multipurpose float switch mounting bracket fixes the float switch onto the pump by connecting the flat plate of the bracket to the float switch and the pump with screws.

14 Claims, 3 Drawing Sheets

MULTIPURPOSE FLOAT SWITCH MOUNTING BRACKET

CROSS REFERENCE TO RELATED APPLICATIONS

The present application is a Continuation Application of PCT Application No. PCT/CN2017/116069 filed on Dec. 14, 2017, which claims the benefit of Chinese Patent Application No. 201721624468.3 filed on Nov. 29, 2017. All the above are hereby incorporated by reference.

TECHNICAL FIELD

The present invention relates to a household sewage pump, in particular to a multipurpose float switch mounting bracket belongs to the technical field of water pumps.

BACKGROUND OF THE INVENTION

Water pumps can be controlled by float switches, the drop of the liquid level will gradually lose buoyancy to the float switch so that the power is automatically cut off, when the liquid level rises, the float switch is automatically closed by buoyancy of float and the pump is powered on.

There are two kinds of conventional float switch mounting brackets, one is fixed on the pump and another is fixed on the outlet pipe, the two kinds of float switch mounting brackets are not interchangeable, that causes that the scope of the brackets' use is limited and there is a need of improvement.

SUMMARY OF THE INVENTION

The technical problem the present invention is to solve is to supply a multipurpose float switch mounting bracket, of which it's optional to the user to fix the float switch onto the water pump or to the outlet pipe, i.e. the accessibility thereof enhanced.

In order to solve the above technical problem, the technical solution of the present invention is provided with a multipurpose float switch mounting bracket, which includes a curved plate and a flat plate, the curved plate is connected to a first end of the flat plate, and two position-limitation strips are arranged on the outer convex surface of the curved plate, the two position-limitation strips are distributed up and down with a distance disposed between them, the flat plate is provided with a first set of mounting holes and a second set of mounting holes, the water pump is provided with a first set of threaded holes which are corresponding to the first set of mounting holes, and the float switch is provided with a second set of threaded holes which are corresponding to the second set of mounting holes, and the curved plate is provided with arc-shaped slots on both edges, the first set of mounting holes are disposed at a second end of the flat plate which is opposite to the first end, the second set of mounting holes is disposed at a back area relative to the first set of mounting holes.

In a preferred embodiment of the present invention, the curved plate and the flat plate are perpendicular to each other.

In a preferred embodiment of the present invention, the curved plate and the flat plate are integrated structures or split structures that made of steel plates, other metallic materials or non-metallic materials.

In a preferred embodiment of the present invention, the connection area between the curved plate and the flat plate is arranged with reinforcement ribs for strengthening.

In a preferred embodiment of the present invention, it also includes a clasping device, a water pipe vertically arranged at the water outlet end of the water pump, wherein the curved plate is attached on the outer wall of the water pipe, and the clasping device hooped on the curved plate and the outer wall of the water pipe, and the clasping device passes the arc-shaped slots and disposed between the two position-limitation strips, and the float switch is arranged on the flat plate via screw bolts go through the second set of mounting holes and the second set of threaded holes.

In a preferred embodiment of the present invention, the curved plate is provided with a punched slot between the two position-limitation strips, and the two position-limitation strips and the curved plate are integrated structures.

In a preferred embodiment of the present invention, the first set of mounting holes and the second set of mounting holes respectively consist of at least two through holes.

In a preferred embodiment of the present invention, the flat plate is arranged on the water pump, the curved plate extends downwards, and the flat plate is secured via screw bolts pass through the first set of mounting holes and the first set of thread holes, and the float switch is secured on the flat plate via screw bolts pass through the second set of mounting holes and the second set of thread holes.

The beneficial effect of the invention is: The invention is provided with a multipurpose float switch mounting bracket, which can fix the float switch onto the water pump by connecting the flat plate of the bracket to the float switch and the water pump respectively with screws. In addition, the curved plate can be fixed on the side of the water pipe by means of the clasping device, and fix the float switch on the flat plate to secure the float switch. The conversion is convenient and the versatility is wide. It can match different sizes of water pipes and has a wide range of applications.

BRIEF DESCRIPTION OF THE FIGURES

In order to more clearly illustrate the technical solutions in the embodiments of the present invention, the drawings used in the description of the embodiments will be briefly described below. Obviously, the drawings in the following description are merely some embodiments of the present invention. For those who skilled in the art, other drawings may also be obtained based on these drawings without paying any creative work. Therein.

DETAILED DESCRIPTION

The following is clear and complete description of the technical solutions in the embodiments of the present invention. Apparently, the described embodiments are merely some but not all embodiments of the present invention. All other embodiments obtained by a person who is skilled in the art based on the disclosed embodiments of the present invention without creative efforts shall fall within the protection scope of the present invention.

Figure 1:
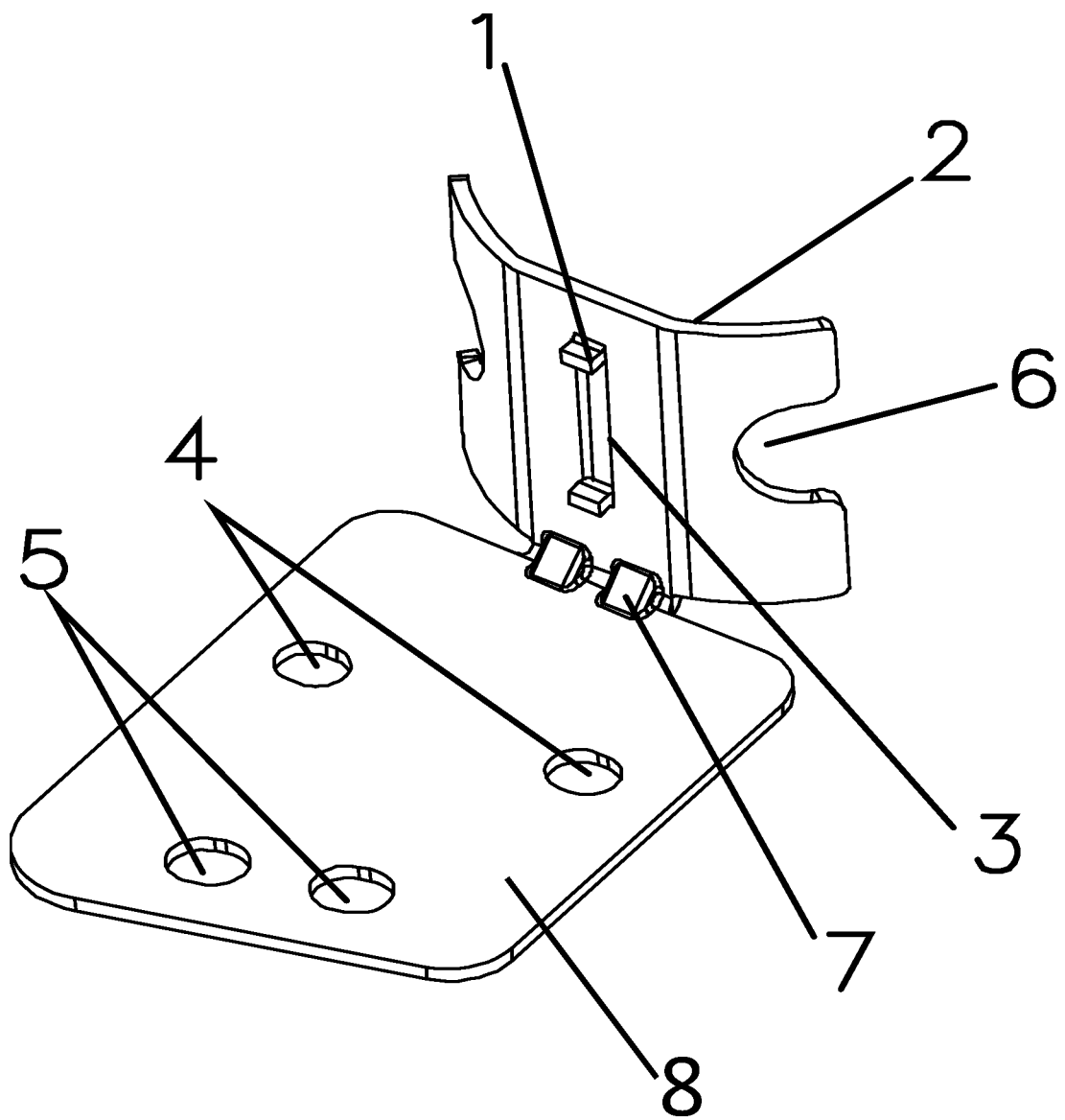
FIG. 1 is a schematic structural view of a preferred embodiment of a multipurpose float switch mounting bracket of present invention.
Figure 2:
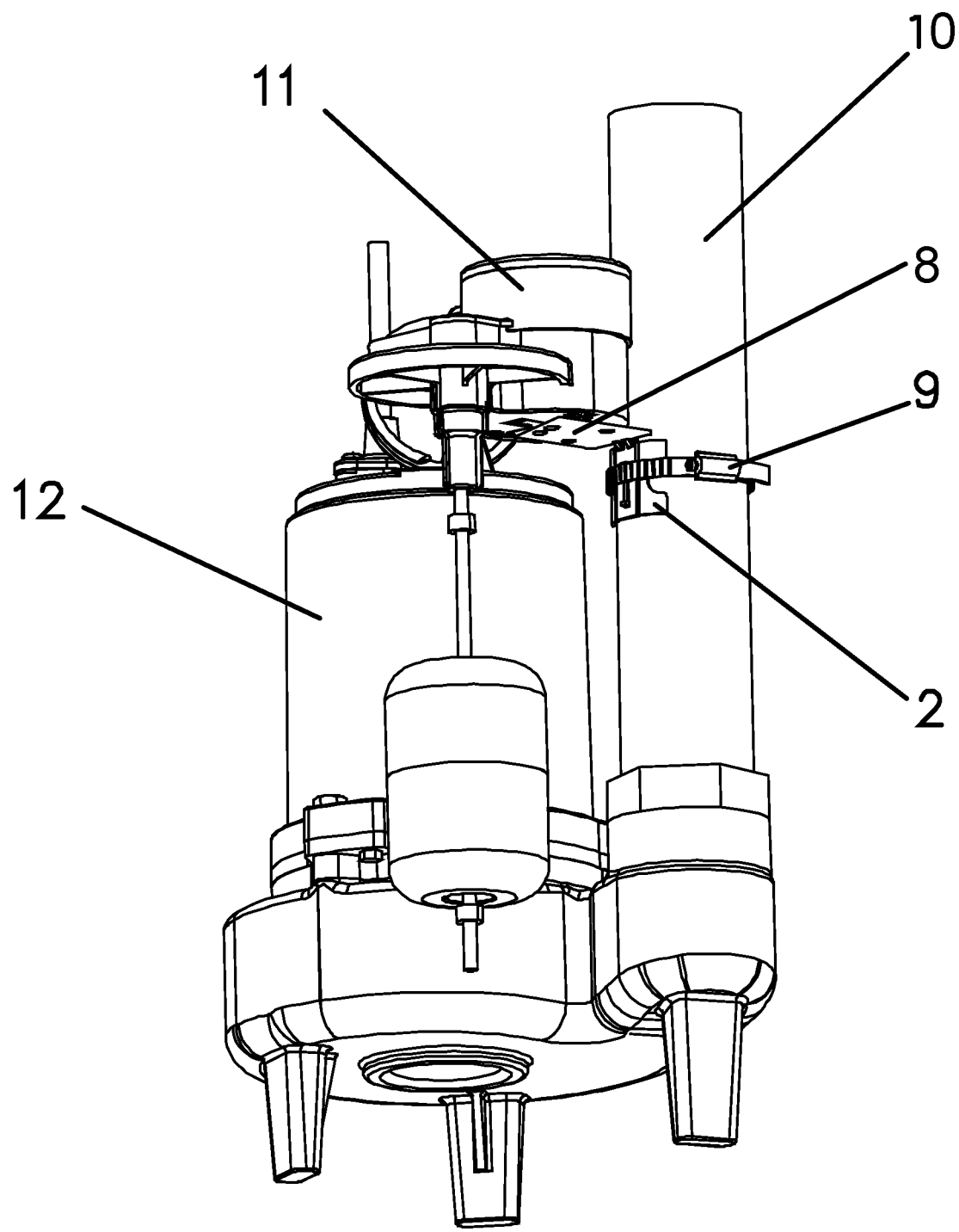
FIG. 2 is a schematic structural view of a float switch mounted on the water pipe by utilizing the multipurpose float switch mounting bracket of present invention.
Figure 3:
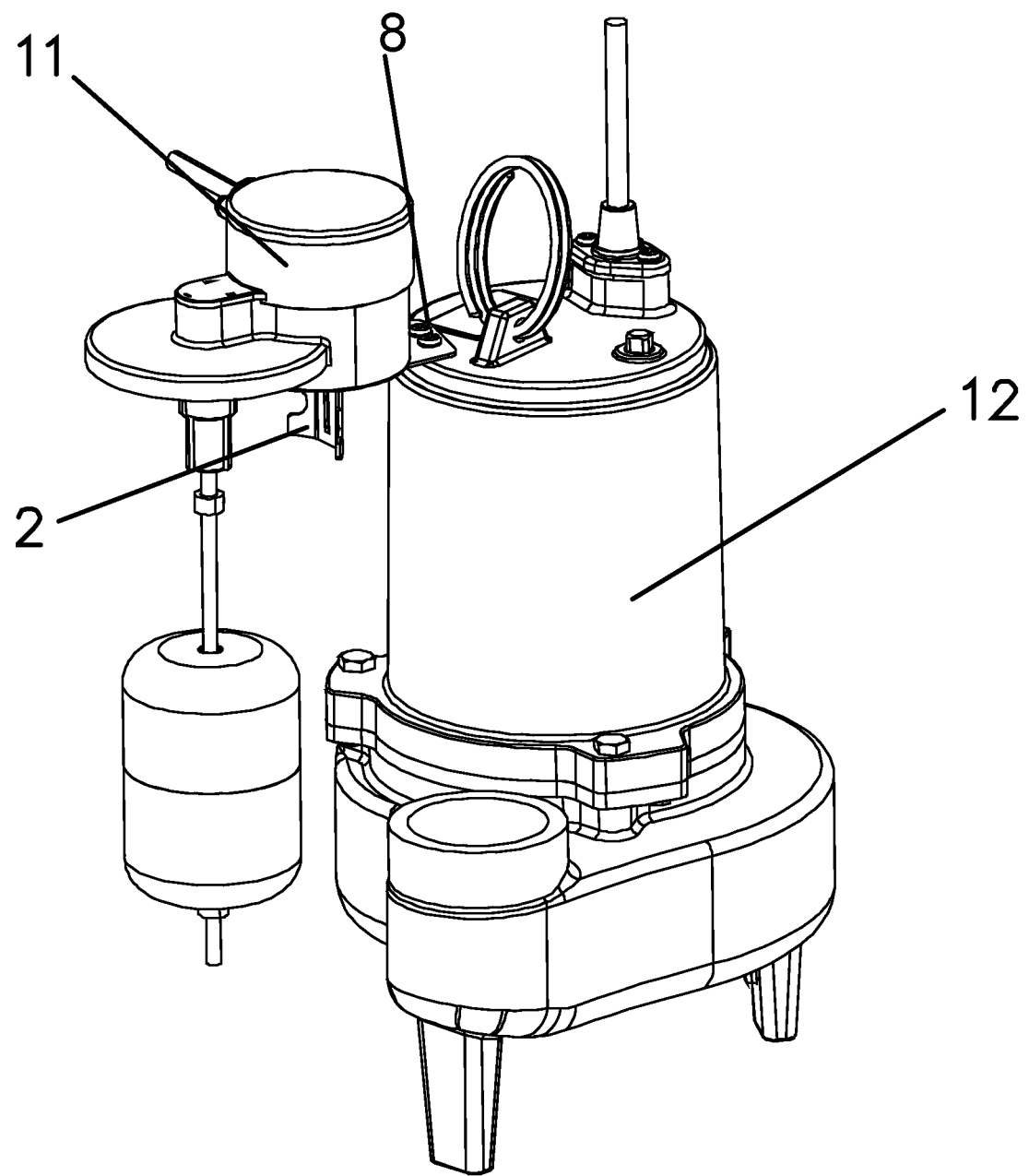
FIG. 3 is a schematic structural view of a float switch mounted on the water pump by utilizing the multipurpose float switch mounting bracket of present invention.

Please refer to FIG. 1-FIG. 3, embodiments of the present invention are set out as the following:

A multipurpose float switch mounting bracket, which includes a curved plate 2 and a flat plate 8, the curved plate 2 is connected to a first end of the flat plate 8, the curved plate 2 and the flat plate 8 are perpendicular to each other, the curved plate 2 and the flat plate 8 respectively are integrated steel plate bending structures, which is strong and easily for producing, the connection area between the curved plate 2 and the flat plate 8 is arranged with reinforcement ribs 7 for improving the structural stability and avoiding deformation problems.

On the outer convex surface of the curved plate 2 where is arranged with two position-limitation strips 1, the two position-limitation strips 1 are distributed up and down with a distance disposed between them, the curved plate 2 is provided with a punched slot 3 between the two position-limitation strips 1, the two position-limitation strips 1 and the curved plate 2 are integrated structures, applying the punching process to bend the material out of the punched slot 3 to obtain the position-limitation strips 1, the structure is strong and the producing is easy.

The flat plate 8 is provided with the first set of mounting holes 5 and the second set of mounting holes 4, the first set of mounting holes 5 is located at a first end of the flat plate 8, the second set of mounting holes 4 is located at a relatively hack area of the first set of mounting holes 5. The water pump 12 is provided with the first set of threaded holes which are corresponding to the first set of mounting holes 5. The float switch 11 is provided with the second set of threaded holes which are corresponding to the second set of mounting holes 4. The design makes the connection easy. The first set of mounting holes 5 and the second set of mounting holes 4 respectively consist of at least two through holes. It is flexible for installation options and is suitable for obverse and reverse installing.

Two embodiments of using the multipurpose float switch mounting bracket are set out as the following:

First, refer to FIG. 2, the float switch is installed on the outlet pipe via the multipurpose float switch mounting bracket, the curved plate 2 is provided with arc-shaped slots 6 at its both edges, and the water pipe 10 is vertically provided at the water outlet end of the water pump 12, wherein the curved plate 2 is attached to the outer wall of the water pipe 10 via the clasping device 9 so as to secure the curved plate 2 to the outer wall of water pipe 10. The clasping device 9 passes the area between the arc-shaped slots 6 and the area between the two position-limitation strips 1, and the effect of position-limitation is good. The design avoids the slip problem. And then set the float switch 11 on the flat plate 8 by using screw bolts passing through the second set of mounting holes 4 with the second set of threaded holes, the structure is firm, and the clasping device 9 could be straps, ropes or other similar means of easy use;

Second, refer to FIG. 3, the float switch is installed on the pump via the multipurpose float switch mounting bracket. The flat plate 8 is connected to the water pump 12. The curved plate 2 extends downwards to leave room to the float 11. The flat plate 8 is secured by screw bolts passing through the first set of mounting holes 5 and the first set of threaded holes, and the float switch 11 is secured on the flat plate 8 via screw bolts passing through the second set of mounting holes 4 and the second set of threaded holes.

In summary, the invention is provided with a multipurpose float switch mounting bracket, in which the structure design of curved plate 2 and clasping device 9 is suitable for pipes of different specifications, it makes the connection more convenient and reliable, combined the two kinds of conventional mounting brackets into one bracket, which is convenient for management and saves cost, and is conducive to customers' installation in various conditions.

The foregoing descriptions are merely embodiments of the present invention, and therefore do not mean to limit the protection scope of the present invention. Any implementation on the content of the present specification by using the same or any alternative structure or equivalent process which transformed without any creative labor should be covered within the scope of the protection of the present invention. Therefore, the scope of protection of the invention shall be subject to the scope of protection defined in the patent claim.

What is claimed is:

1. A combination of a float switch, a water pump, and a multipurpose float switch mounting bracket for fixing the float switch to the water pump, the multipurpose float switch mounting bracket comprising a curved plate and a flat plate, wherein the curved plate is connected to a first end of the flat plate, and two position-limitation strips are arranged on an outer convex surface of the curved plate, the two position-limitation strips are distributed up and down with a distance disposed between them, the flat plate is provided with a first set of mounting holes and a second set of mounting holes, the water pump is provided with a first set of threaded holes which are corresponding to the first set of mounting holes, and the float switch is provided with a second set of threaded holes which are corresponding to the second set of mounting holes, the first set of mounting holes are disposed at a second end of the flat plate which is opposite to the first end, the second set of mounting holes are disposed at a back area relative to where the first set of mounting holes are disposed, and the curved plate is provided with arc-shaped slots on both side edges.

2. The combination according to claim 1, wherein the curved plate and the flat plate are perpendicular.

3. The combination according to claim 1, wherein the curved plate and the flat plate are integrated structures or split structures.

4. The combination according to claim 1, characterized in that the wherein a connection area between the curved plate and the flat plate is arranged with reinforcement ribs for strengthening.

5. The combination according to claim 1, further comprising a clasping device, and a water pipe vertically arranged at a water outlet end of the water pump, wherein the curved plate is attached on an outer wall of the water pipe, and the clasping device is hooped on the curved plate and the outer wall of the water pipe, and the clasping device passes the arc-shaped slots and is disposed between the two position-limitation strips, wherein the float switch is arranged on the flat plate via screw bolts that go through the second set of mounting holes and the second set of threaded holes.

6. The combination according to claim 1, wherein the curved plate is provided with a punched slot between the two position-limitation strips, and the two position-limitation strips and the curved plate are integrated structures.

7. The combination according to claim 1, wherein the first set of mounting holes and the second set of mounting holes respectively consist of at least two through holes.

8. The combination according to claim 1, wherein the flat plate is arranged on the water pump, the curved plate extends downwards, and the flat plate is secured to the water pump via screw bolts that pass through the first set of mounting holes and the first set of thread holes, and the float switch is secured on the flat plate via screw bolts that pass through the second set of mounting holes and the second set of thread holes.

9. A multipurpose float switch mounting bracket for fixing a float switch to a water pump, comprising a curved plate and a flat plate, wherein the curved plate is connected to a first end of the flat plate, and two position-limitation strips are arranged on an outer convex surface of the curved plate, the two position-limitation strips are distributed up and down with a distance disposed between them, the flat plate is provided with a first set of mounting holes corresponding to a first set of threaded holes of the water pump and a second set of mounting holes corresponding to a second set of threaded holes of the float switch, the first set of mounting holes are disposed at a second end of the flat plate which is opposite to the first end, the second set of mounting holes are disposed at a back area relative to where the first set of mounting holes are disposed, and the curved plate is provided with arc-shaped slots on both side edges.

10. The multipurpose float switch mounting bracket according to claim 9, wherein the curved plate and the flat plate are perpendicular.

11. The multipurpose float switch mounting bracket according to claim 9, wherein the curved plate and the flat plate are integrated structures or split structures.

12. The multipurpose float switch mounting bracket according to claim 9, wherein a connection area between the curved plate and the flat plate is arranged with reinforcement ribs for strengthening.

13. The multipurpose float switch mounting bracket according to claim 9, wherein the curved plate is provided with a punched slot between the two position-limitation strips, and the two position-limitation strips and the curved plate are integrated structures.

14. The multipurpose float switch mounting bracket according to claim 9, wherein the first set of mounting holes and the second set of mounting holes respectively consist of at least two through holes.

\* \* \* \* \*